(12) United States Patent
Coleman et al.

(10) Patent No.: US 9,291,723 B2
(45) Date of Patent: Mar. 22, 2016

(54) INSTRUMENT FOR ASSAYING RADIATION

(71) Applicant: SAVANNAH RIVER NUCLEAR SOLUTIONS, LLC, Aiken, SC (US)

(72) Inventors: Jody Rustyn Coleman, Aiken, SC (US); Eduardo B. Farfan, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 13/928,855

(22) Filed: Jun. 27, 2013

(65) Prior Publication Data
US 2015/0001406 A1 Jan. 1, 2015

(51) Int. Cl.
*G01T 1/20* (2006.01)
*G01T 1/169* (2006.01)

(52) U.S. Cl.
CPC .............. *G01T 1/2018* (2013.01); *G01T 1/169* (2013.01)

(58) Field of Classification Search
CPC ............................ G01T 1/169; G01T 1/2018
USPC ........................................................ 250/366
See application file for complete search history.

(56) References Cited

U.S. PATENT DOCUMENTS

| 4,221,967 | A | * | 9/1980 | Wang et al. ............... 250/363.02 |
|---|---|---|---|---|
| 4,980,552 | A | * | 12/1990 | Cho et al. ................. 250/363.03 |
| 5,373,162 | A | * | 12/1994 | Akai ............................. 250/366 |
| 5,591,976 | A | * | 1/1997 | Berthold et al. ........... 250/363.1 |
| 6,285,740 | B1 | * | 9/2001 | Seely et al. .................... 378/98.9 |
| 7,094,203 | B2 | * | 8/2006 | Inoue et al. .................... 600/439 |
| 8,324,586 | B2 |  | 12/2012 | Schmidt et al. |
| 8,368,021 | B2 | * | 2/2013 | Stratmann et al. ............ 250/330 |
| 8,502,168 | B1 | * | 8/2013 | Poteet et al. ................ 250/461.1 |
| 2004/0218714 | A1 | * | 11/2004 | Faust .............................. 378/53 |
| 2009/0039277 | A1 | * | 2/2009 | Iwakiri ..................... 250/370.09 |
| 2010/0052891 | A1 | * | 3/2010 | Chainer et al. ................ 340/517 |
| 2010/0080436 | A1 | * | 4/2010 | Ohara ........................... 382/132 |
| 2011/0080995 | A1 | * | 4/2011 | Hoffman et al. ................ 378/19 |
| 2011/0275356 | A1 | * | 11/2011 | Best et al. .................. 455/414.1 |
| 2013/0019462 | A1 |  | 1/2013 | Shoji et al. |

* cited by examiner

*Primary Examiner* — Kiho Kim
(74) *Attorney, Agent, or Firm* — Dority & Manning, P.A.

(57) ABSTRACT

An instrument for assaying radiation includes a flat panel detector having a first side opposed to a second side. A collimated aperture covers at least a portion of the first side of the flat panel detector. At least one of a display screen or a radiation shield may cover at least a portion of the second side of the flat panel detector.

19 Claims, 4 Drawing Sheets

INSTRUMENT FOR ASSAYING RADIATION

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The present invention generally involves an instrument for assaying radiation. In particular embodiments, the instrument may enable high resolution and/or real time mapping of a radiologically controlled area.

BACKGROUND OF THE INVENTION

The use of radioactive material occasionally results in radiation and/or contamination areas that require decontamination or other remedial efforts. In some cases, the radiation and/or contamination levels may be significant, and the specific locations of the radiation and/or contamination may not be accurately known. As a result, various instruments have been developed to assay radiation and contamination areas so that the costs and personnel exposures associated with the decontamination or other remediation efforts can be reduced.

Various factors are considered in the design and selection of instruments to assay radiation and/or contamination areas. For example, the responsive range of the instruments should be selected so that the instruments are capable of reliably measuring varying levels of radiation without requiring excessive exposure times while also having sufficient sensitivity to discriminate between separate sources of radiation and/or locations of contamination. In addition, remote positioning and operation of the instruments is often desirable to reduce personnel exposure, particularly when the radiation and/or contamination levels are high or unknown. As a result, various improvements in instruments used to assay radiation and/or contamination areas that enhance sensitivity and/or remote positioning of the instruments would be useful.

BRIEF DESCRIPTION OF THE INVENTION

Aspects and advantages of the invention are set forth below in the following description, or may be obvious from the description, or may be learned through practice of the invention.

One embodiment of the present invention is an instrument for assaying radiation that includes a flat panel detector having a first side opposed to a second side. A collimated aperture covers at least a portion of the first side of the flat panel detector.

Another embodiment of the present invention is an instrument for assaying radiation that includes a flat panel detector having a first side opposed to a second side. A collimated aperture covers at least a portion of the first side of the flat panel detector. At least one of a display screen or a radiation shield covers at least a portion of the second side of the flat panel detector.

In yet another embodiment of the present invention, an instrument for assaying radiation includes a scintillation layer having a first side opposed to a second side. A collimated aperture covers at least a portion of the first side of the scintillation layer, and a photodiode layer covers at least a portion of the second side of the scintillation layer. At least one of a display screen or a radiation shield covers at least a portion of the photodiode layer.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
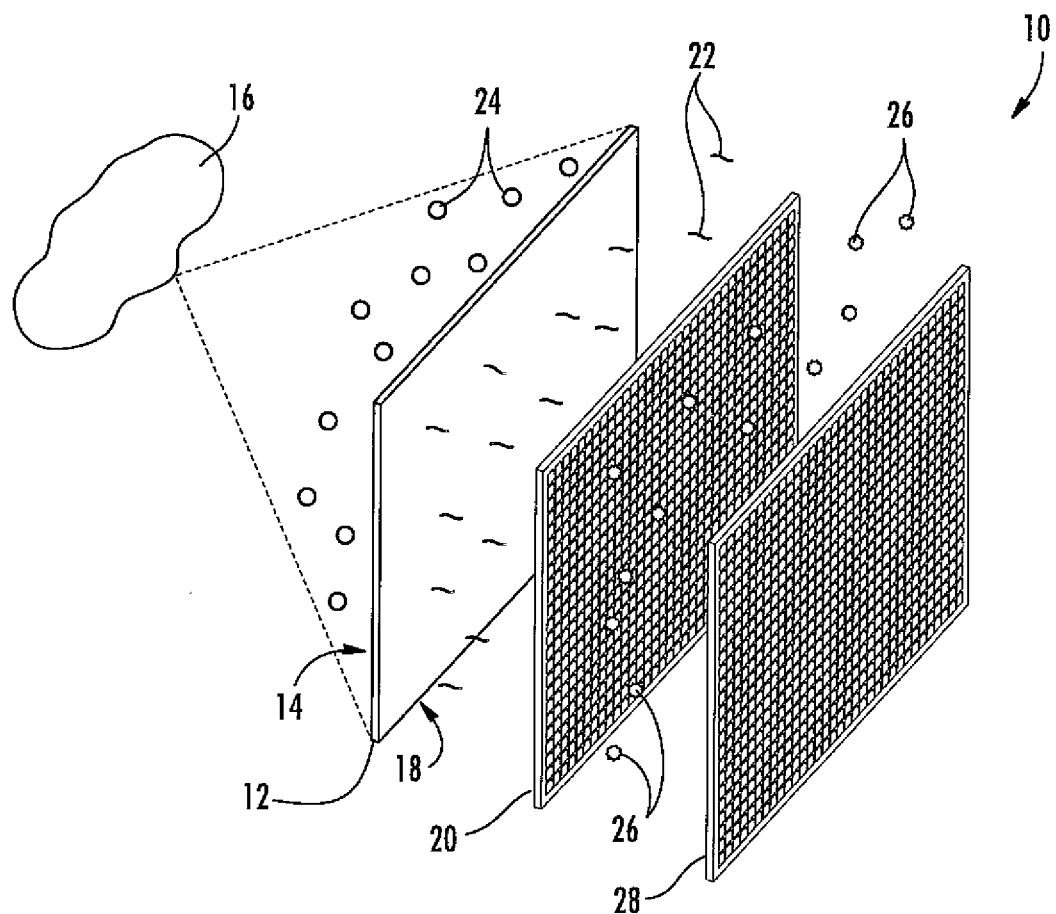
FIG. 1 is an exploded perspective view of an exemplary flat panel detector within the scope of various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream," "downstream," "radially," and "axially" refer to the relative direction with respect to particle movement. For example, "upstream" refers to the direction from which the particle flows, and "downstream" refers to the direction to which the particle flows. Similarly, "radially" refers to the relative direction substantially perpendicular to the particle flow, and "axially" refers to the relative direction substantially parallel to the particle flow.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include an instrument for assaying radiation. The instrument generally includes one or more flat panel detectors and a collimated aperture that enables the instrument to discriminate between different radiation sources and/or different locations of the same radiation source to facilitate real-time or near real-time mapping of radiation and/or contamination areas. In particular embodiments, the collimated aperture may include a pinhole collimator, a shadow collimator, and/or a coded aperture. In addition, the flat panel detector may be integrated with a tablet computer, laptop computer, or other processor that enables data fusion with one or more additional environmental sensors such as a camera, a position sensor, etc. in a single, compact, and lightweight instrument.

Referring now to the drawings, wherein identical numerals indicate the same elements throughout the figures, FIG. 1 provides a perspective view of an exemplary flat panel detector 10 which may be incorporated into various embodiments of the present invention. One of ordinary skill in the art will readily appreciate that flat panel detectors are commercially available for medical and non-destructive testing applications, and a detailed description of the theory of operation of a flat panel detector is not necessary to understand the various embodiments of the present invention. In general, each flat panel detector 10 may include a scintillation layer 12 having a first side 14 facing a radiation source 16 and a second side 18 opposed to a photodiode layer 20. The scintillation layer 12 may include various materials such as sodium iodide (NaI), cesium iodide (CsI), gadolinium oxysulfide ($Gd_2O_2S$), and/or other phosphors that emit photons 22 when exposed to radiation 24. The photodiode layer 20 may include a two-dimensional matrix of light sensitive electronics such as avalanche photodiodes and/or photo-resistors that produce electrons 26 in response to the photons 22 produced by the scintillation layer 12. In addition, the photodiode layer 20 may include a matrix of thin film transistors 28 made from amorphous silicon that receive and store the electrons produced by the photodiodes and/or photo-resistors. In this manner, the scintillation layer 12 may convert the radiation 24 to photons 22, the photodiode layer 20 may convert the photons to electrons, and the thin film transistors 28 may store the electrons for further display and/or analysis.

Figure 2:
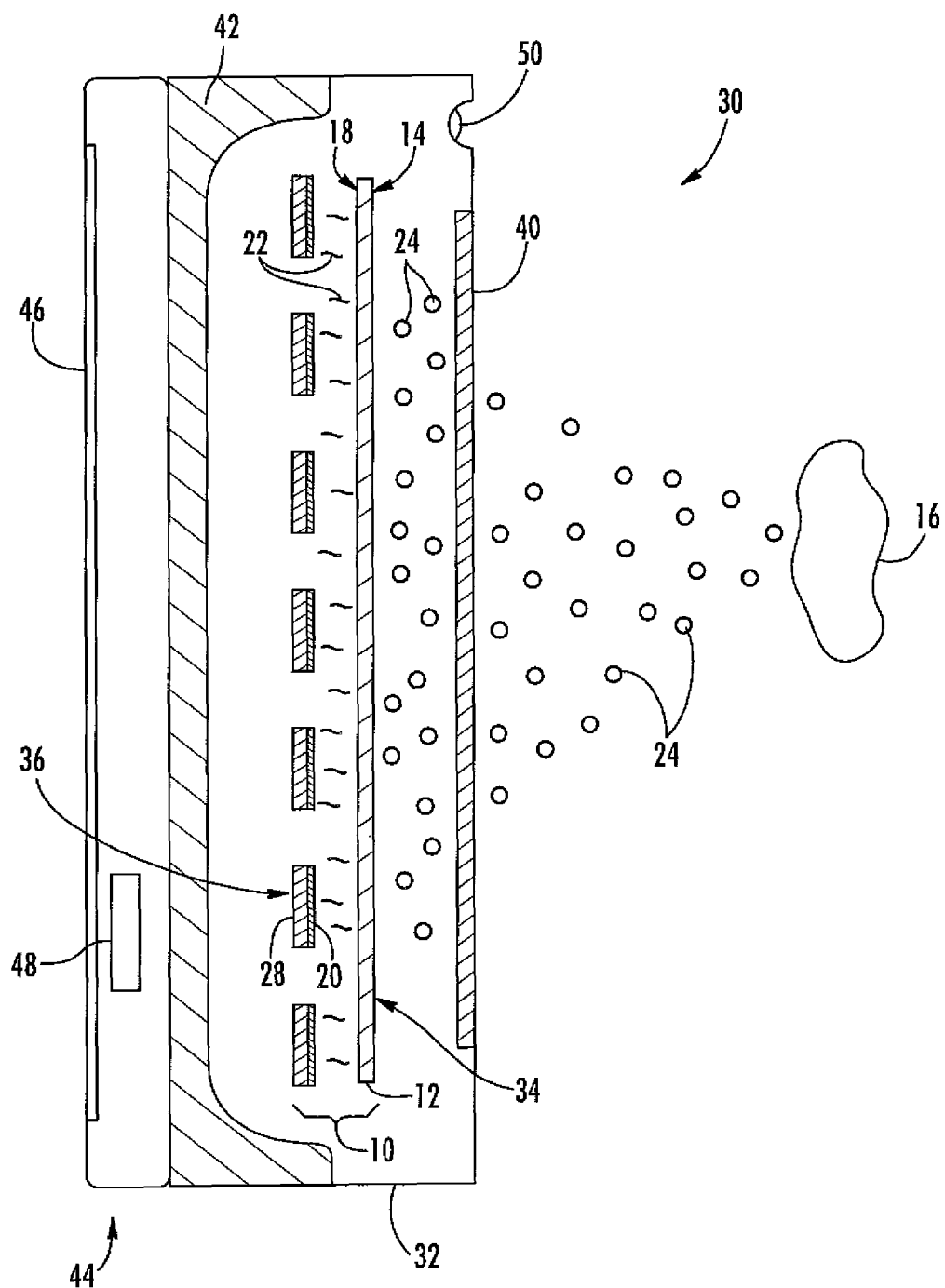
FIG. 2 is a side cross-section view of an exemplary instrument for assaying radiation according to one embodiment of the present invention.

FIG. 2 provides a side cross-section view of an exemplary instrument 30 for assaying radiation according to one embodiment of the present invention. The instrument 30 may include a case that holds a flat panel detector, such as the flat panel detector 10 previously described and illustrated with respect to FIG. 1. The flat panel detector 10 may be positioned inside the case 32 so that a first side 34 of the flat panel detector 10, i.e., the first side 14 of the scintillation layer 12, faces the radiation source 16 and an opposing second side 36 of the flat panel detector 10 faces away from the radiation source 16. As shown in FIG. 2, a collimated aperture 40 may cover at least a portion of the first side 34 of the flat panel detector 10 to diffuse, shield, or otherwise block a portion of the radiation 24 from reaching the scintillation layer 12 of the flat panel detector 10. As will be described more fully with respect to FIG. 4, the collimated aperture 40 creates a field of view for the instrument 30 to enhance the ability of the instrument 30 to discriminate and/or distinguish between different radiation sources 16 and/or different locations of the same radiation source 16. The instrument 30 or case 32 may further include a radiation shield 42 that covers at least a portion of the second side 36 of the flat panel detector 10. The shield 42 may completely cover the second side 36 of the flat panel detector 10 and extend partially around the flat panel detector 10 to prevent background radiation and/or radiation from other radiation sources outside the field of view from reaching the scintillation layer 12 of the flat panel detector 10. The shield 42 may be made from tungsten, lead, or other elements and/or alloys having a high atomic number suitable for at least partly shielding radiation. If desired, the shield 42 may be made from aluminum or aluminum alloys that provide sufficient shielding inside the case 32 while also reducing the weight of the instrument 30 to enhance portability and positioning of the instrument 30.

The instrument 30 may be operably coupled to a tablet computer, a laptop computer, or other processor that may enable data from the instrument 30 to be integrated with other environmental data to provide a user with a real-time or near real-time mapping of radiation and/or contamination areas. For example, as shown in FIG. 2, the instrument 30 may be operably coupled to a tablet computer 44 so that a display screen 46 covers at least a portion of the second side 36 of the flat panel detector 10, and a processor 48 associated with the tablet computer 44 may be located between the display screen 46 and the flat panel detector 10. In addition, various environmental sensors, such as a camera 50, a global positioning system, a temperature sensor, a humidity sensor, a neutron detector, an accelerometer, a gas detector, etc., may be incorporated into and/or aligned with the instrument 30 and/or flat panel detector 10. The user may thus point the instrument 30 by facing the collimated aperture 40 and camera 50 in a particular direction. The flat panel detector 10 will detect and measure the radiation 24 that passes through the collimated aperture 40 while the camera 50 simultaneously records still pictures and/or video of the environment. The processor 48 in the tablet computer 44 may integrate the data streams from the flat panel detector 10, camera 50, and any other environmental sensors and display the combined information on the display screen 46. In this manner, the user may have a real-time or near real-time image and/or video of the environment with an overlay of the radiation and/or contamination levels present.

Figure 3:
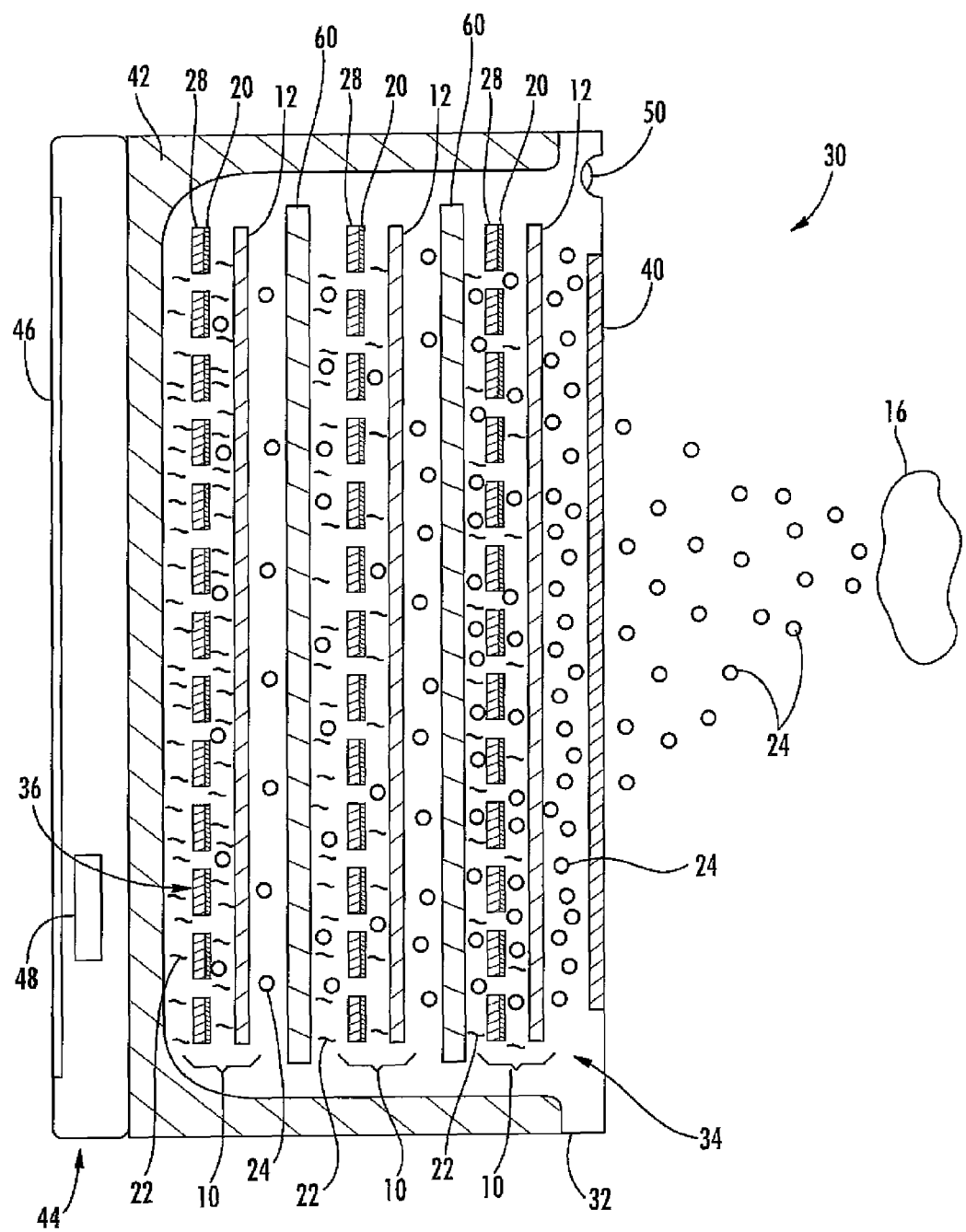
FIG. 3 is a side cross-section view of an exemplary instrument for assaying radiation according to an alternate embodiment of the present invention.

FIG. 3 provides a side cross-section view of an exemplary instrument 30 for assaying radiation according to an alternate embodiment of the present invention. The instrument 30 again includes the case 32, collimated aperture 40, tablet computer 44, and environmental sensor 50 as previously described with respect to the embodiment shown in FIG. 2. In this particular embodiment, the instrument 30 also includes multiple flat panel detectors 10 with an attenuator layer 60 sandwiched between adjacent flat panel detectors 10. The geometry, number, and thickness of the attenuator layers 60 may be selected based on the anticipated activity level and/or energy level present in the radiation source 16 to partially shield radiation that passes through the flat panel detectors 10. Suitable attenuator layers 60 may include, for example, metal, plastic, glass, or materials with higher atomic numbers, depending on the anticipated activity level and/or energy level of the radiation present.

The attenuator layers 60 produce a different exposure for each flat panel detector 10 exposed to radiation. For example, radiation 24 exposed to the instrument 30 will produce the largest exposure in the right-most flat panel detector 10 shown in FIG. 3. The attenuation provided by each attenuator layer 60 will progressively decrease exposures to each successive flat panel detector 10 moving from right to left. The number of flat panel detectors 10 and the attenuation coefficients for the attenuator layers 60 may be varied as desired to achieve a desired sensitivity to radiation and/or discrimination of different energy levels. As a result, the energy level and intensity of the radiation source 16 may be determined by simultaneous examination of each flat panel detector 10.

Figure 4:
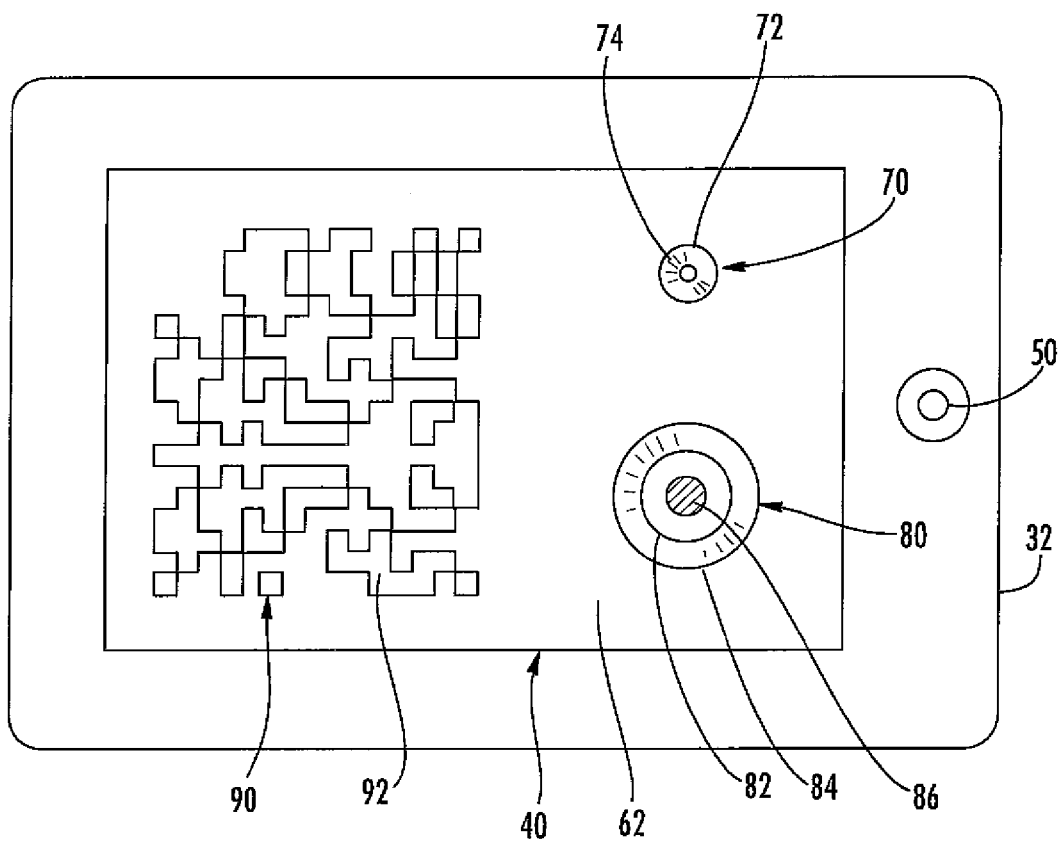
FIG. 4 is a plan view of collimated apertures within the scope of various embodiments of the present invention.

The collimated aperture 40 enhances the ability of the instrument 30 to discriminate between multiple radiation sources 16 and/or the same radiation source 16 at different locations, and FIG. 4 provides a plan view of an exemplary collimated aperture 40 that may be incorporated into any of the embodiments of the present invention. Referring to FIGS. 2-4, the collimated aperture 40 generally fits within the perimeter of the case 32 and covers at least a portion of the first side 34 of the outermost flat panel detector 10. In the exemplary embodiment shown in FIG. 4, the collimated aperture 40 generally includes a shield 62 that prevents radiation from passing through the shield 62 and into the instrument 30.

The shield 62 may be made from any material that is effectively opaque to the activity and energy levels of the anticipated radiation source 16. For example, the shield 62 may be a sheet of lead, tungsten, or similarly high atomic number material known in the art for effectively shielding radiation. Alternately, the shield 62 may be made from aluminum or aluminum alloys that provide sufficient diffraction of the anticipated radiation while also reducing the weight of the instrument 30 to enhance portability and positioning of the instrument 30. The collimated aperture 40 further includes one or more of a pinhole collimator 70, a shadow collimator 80, or a coded aperture collimator 90 through the shield 62. One of ordinary skill in the art will readily appreciate from the teachings herein that particular embodiments may include various combinations and numbers of one or more of the particular collimators 70, 80, 90 shown in FIG. 4.

The pinhole collimator 70 generally includes a hole 72 through the shield 62 that allows radiation to pass through the hole 72 to reach the flat panel detector(s) 10 inside the instrument 30. The shield 62 may include a beveled surface 74 around the hole 72 to effectively increase the field of view to the flat panel detector(s) 10 provided by the hole 72. The radiation passing through the hole 72 will be inverted horizontally and vertically to produce a mirror image on the flat panel detector(s) 10, similar to the mirror image produced by a pinhole camera. The benefit of the pinhole collimator 70 is that it is relatively easy to design, manufacture, and analyze. However, the size of the hole 72 limits the amount of radiation that can pass through the shield 62, particularly at greater distances, reducing the sensitivity of the instrument 30 to low activity level radiation sources 16. As a result, the pinhole collimator 70 is more useful with larger activity level radiation sources 16 and/or closer geometries from the radiation sources 16.

The shadow collimator 80 generally includes a hole 82 and a beveled surface 84 that defines a larger field of view for the flat panel detector(s) 10 compared to the pinhole collimator 70. In addition, an insert 86 suspended above the hole 82 blocks a portion of the field of view to the flat panel detector(s) 10. The insert 86 may be made from any material capable of blocking some or all of the radiation 24 entering the hole 82. In this manner, the larger field of view allows more radiation 24 to pass through the hole 82, compared to the pinhole collimator 70, making the shadow collimator 80 more sensitive to lower activity and/or energy level radiation sources 16. In addition, the shielding provided by the insert 86 produces a "shadow" on the flat panel detector(s) 10 where the flat panel detector(s) 10 receive a lower exposure to the radiation 24, and the location of the shadow may be used to determine the direction or location of the radiation source 16 with respect to the instrument. As a result, the shadow collimator 80 is useful for detecting and locating lower activity and/or energy level radiation sources 16. However, multiple radiation sources 16 tend to produce multiple shadows on the flat panel detector(s) 10 that become increasingly difficult to discriminate or differentiate from one another.

The coded aperture collimator 90 includes a grid 92, similar in appearance to a barcode, through the shield 62, and the grid 92 alternately blocks or permits radiation 24 to pass through the shield 62 to the flat panel detector(s) 10. The pattern for the grid 92 is selected based on the anticipated activity and/or energy level of the radiation source 16, and the presence and location of the radiation source 16 may be determined by analyzing the resulting pattern of shadows produced on the flat panel detector(s) 10.

The combination of the various collimators 70, 80, 90 in a single collimated aperture 40, as shown in FIG. 4, provides the instrument 30 with increased sensitivity and discrimination across a wide range of radiation sources 16. In addition, the compact nature of the flat panel detector(s) 10 in concert with the tablet computer 44 provide the user with a light-weight, portable instrument that may provide real-time or near real-time mapping of radiation and/or contamination areas.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An instrument for assaying radiation, comprising:
   a flat panel detector having a first side opposed to a second side, wherein the flat panel detector comprises a scintillation layer on the first side opposed to a photodiode layer on the second side;
   a collimated aperture covering at least a portion of the first side of the flat panel detector;
   a camera aligned with the first side of the flat panel detector.

2. The instrument as in claim 1, wherein the collimated aperture comprises a pinhole collimator.

3. The instrument as in claim 1, wherein the collimated aperture comprises a shadow collimator.

4. The instrument as in claim 1, wherein the collimated aperture comprises a coded aperture collimator.

5. The instrument as in claim 1, further comprising a radiation shield covering at least a portion of the second side of the flat panel detector.

6. The method as in claim 1, further comprising a plurality of the flat panel detectors and an attenuator layer sandwiched between the plurality of the flat panel detectors.

7. The instrument as in claim 1, further comprising a display screen covering at least a portion of the second side of the flat panel detector and a processor between the display screen and the flat panel detector.

8. An instrument for assaying radiation, comprising:
   a flat panel detector having a first side opposed to a second side, wherein the flat panel detector comprises a scintillation layer on the first side opposed to a photodiode layer on the second side;
   collimated aperture covering at least a portion of the first side of the flat panel detector; and
   a display screen covering at least a portion of the second side of the flat panel detector.

9. The instrument as in claim 8, wherein the collimated aperture comprises a pinhole collimator.

10. The instrument as in claim 8, wherein the collimated aperture comprises a shadow collimator.

11. The instrument as in claim 8, wherein the collimated aperture comprises a coded aperture collimator.

12. The instrument as in claim 8, further comprising a plurality of the flat panel detectors and an attenuator layer sandwiched between the plurality of the flat panel detectors.

13. The instrument as in claim 8, further comprising a camera aligned with the first side of the flat panel detector.

14. An instrument for assaying radiation, comprising:
   a scintillation layer having a first side opposed to a second side;

a collimated aperture covering at least a portion of the first side of the scintillation layer;

a photodiode layer covering at least a portion of the second side of the scintillation layer; and a display screen covering at least a portion of the photodiode layer.

15. The instrument as in claim 14, wherein the collimated aperture comprises a pinhole collimator.

16. The instrument as in claim 14, wherein the collimated aperture comprises a shadow collimator.

17. The instrument as in claim 14, wherein the collimated aperture comprises a coded aperture collimator.

18. The instrument as in claim 14, further comprising a plurality of the scintillation layers and a plurality of the photodiode layers and an attenuator layer sandwiched between each pair of scintillation and photodiode layers.

19. The instrument as in claim 14, further comprising a camera aligned with the first side of the scintillation layer.

\* \* \* \* \*